Oct. 6, 1953 — D. C. HUBBARD — 2,654,796
DEAD-END STRAIN CARRIER
Filed Jan. 23, 1950 — 3 Sheets-Sheet 1
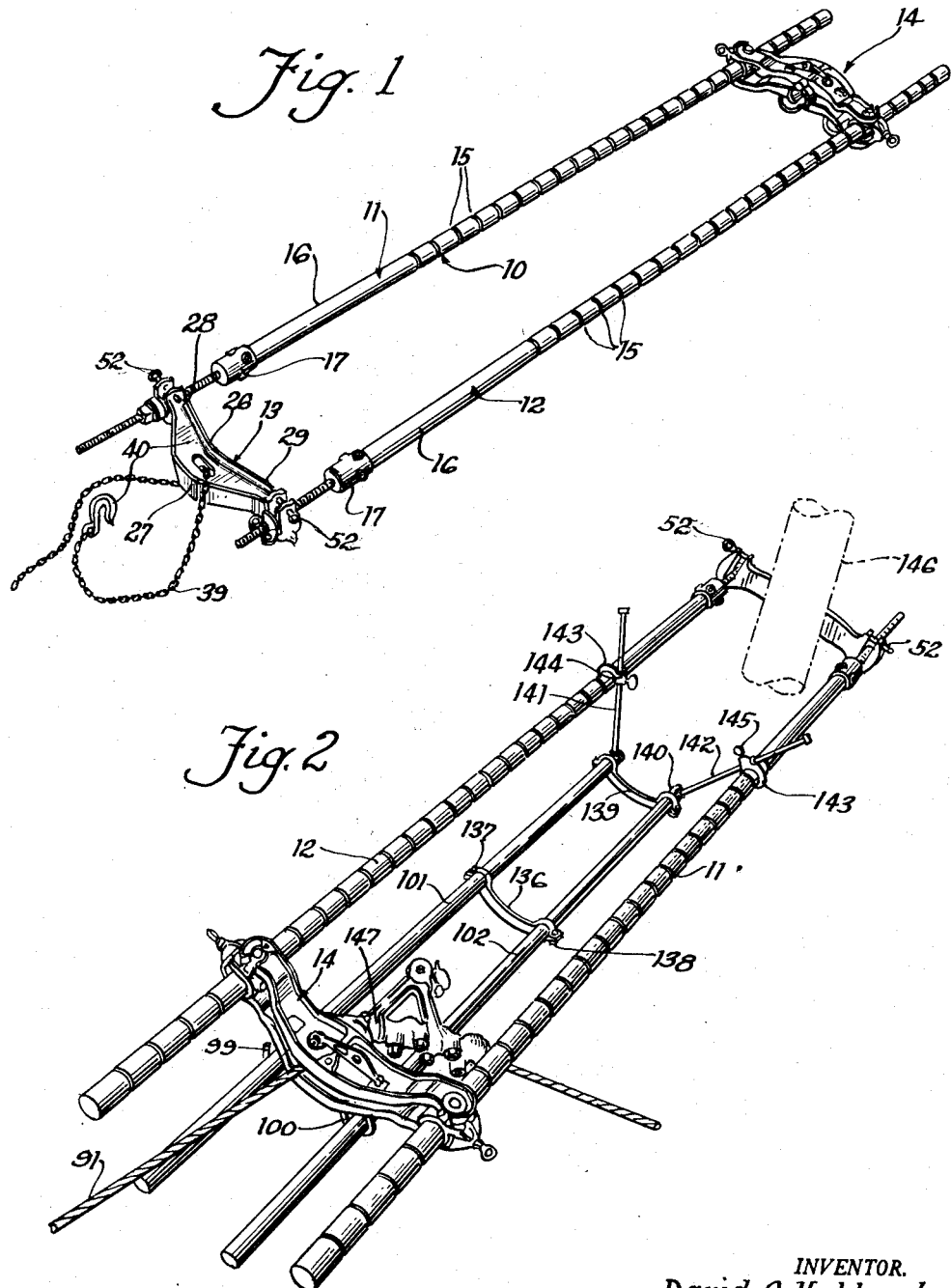
INVENTOR.
David C. Hubbard
BY Robert H. Wendt
Att'y Oct. 6, 1953  D. C. HUBBARD  2,654,796
DEAD-END STRAIN CARRIER
Filed Jan. 23, 1950  3 Sheets-Sheet 2
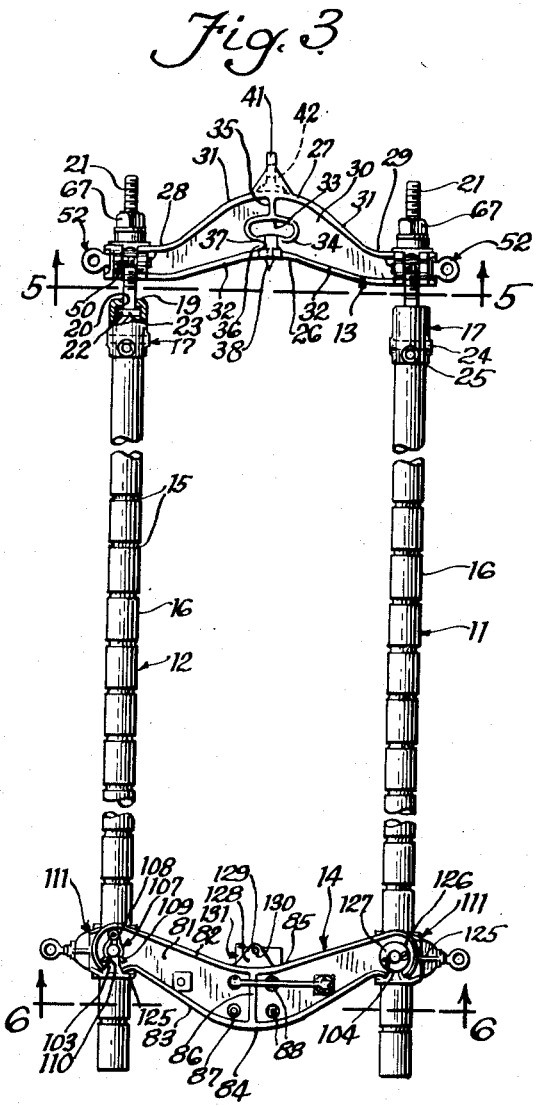
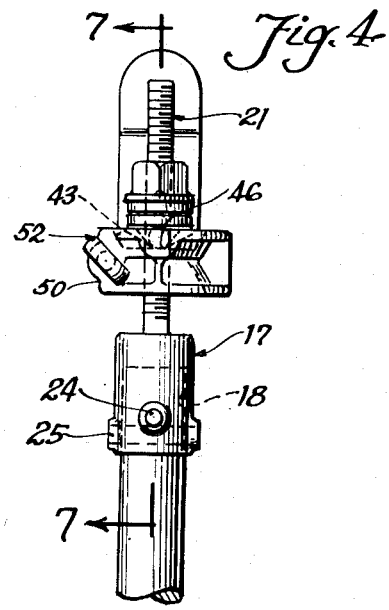
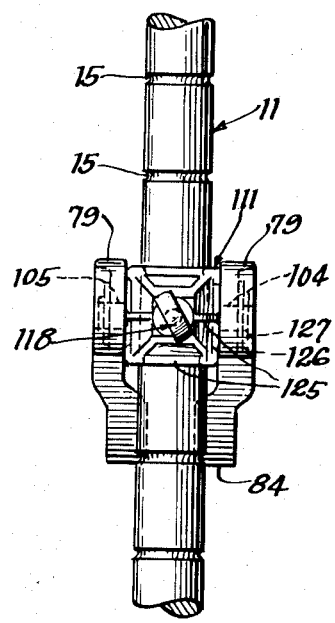
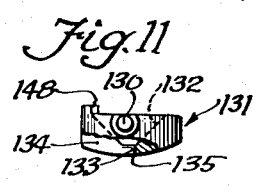
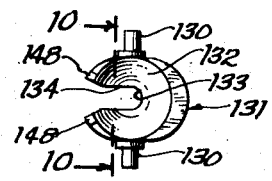
INVENTOR.
David C. Hubbard
BY
Robert H. Wendt
Att'y

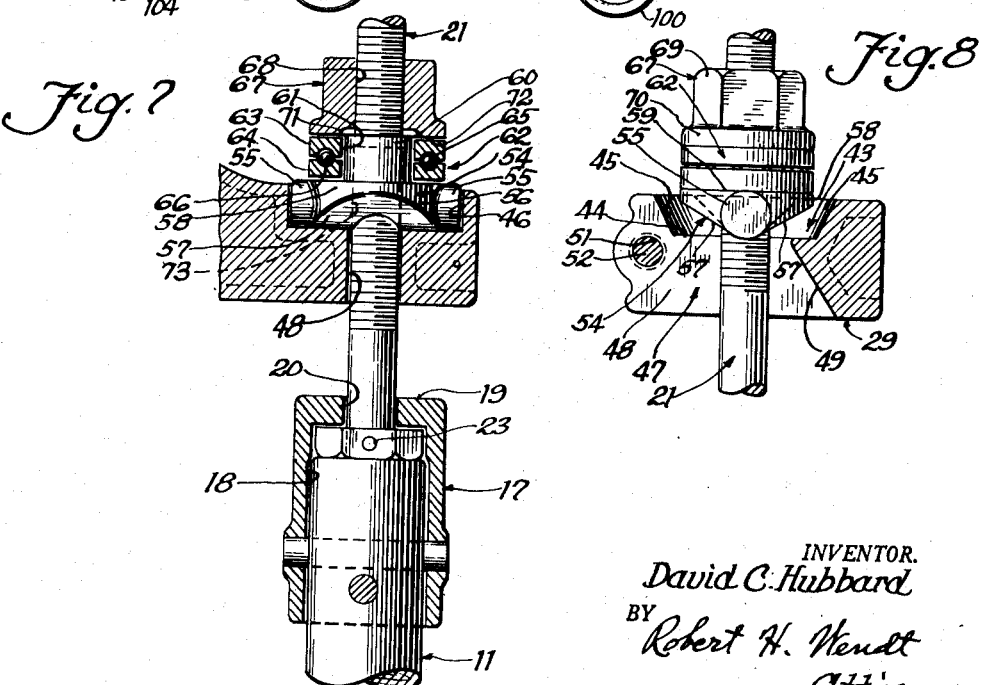

Patented Oct. 6, 1953

2,654,796

UNITED STATES PATENT OFFICE 2,654,796

DEAD-END STRAIN CARRIER

David C. Hubbard, Centralia, Mo., assignor to A. B. Chance Company, Centralia, Mo., a corporation of Missouri Application January 23, 1950, Serial No. 140,121

10 Claims. (Cl. 174—44)

The present invention relates to dead end strain carriers, and is particularly concerned with strain carriers to be used to relieve the load and take the strain off insulators on dead end constructions.

One of the objects of the invention is the provision of an improved strain carrier which may be used on poles, cross arms, steel towers, and which may be used with various different types of dead end clamps, various types of cradles for supporting the insulator, and also which may be used whether there are arcing rings or no arcing rings.

Another object of the invention is the provision of an improved tool of the class described, which is light in weight so that it is easy to carry to the top of the pole, simple to operate, strong in construction, and which is safe because of the safety lock for the conductor and because of the particular construction of the dead end clamp socket.

Another object of the invention is the provision of an improved strain carrier of the class described, which can be used with less effort because the operator tightens only one pole at a time and pulls only half of the dead end load at one time, which can be mounted quickly and easily in practically all places desired, and which can be installed through arcing rings and will hold most dead end clamps or provide a place to attach wire grips.

Another object is the provision of an improved strain carrier in which the poles are free of bending strain while they are being used because of the pivotal movement permitted between the yokes and the poles, thus making the strain carrier more safe because of the fact that the poles will not be broken by bending.

Another object is the provision of an improved, quick detachable means for holding one of the poles in place while the other pole is being installed on the yoke, and in which one pole is conveniently removed for storage.

Another object is the provision of an improved tool of the class described, which is adjustable in length and which is easily and quickly taken apart to be stored in a minimum amount of space so that the wood members may be protected against moisture or abrasion.

Other objects and advantages of the invention will be apparent from the following description and the accompanying drawings, in which similar characters of reference indicate similar parts throughout the several views.

Referring to the three sheets of drawings accompanying the specification,

Fig. 1 is a view in perspective of a complete strain carrier embodying the invention;

Fig. 2 is a similar view showing how the strain carrier may be used with the line pole inside its yoke, and showing a cradle for supporting the string of insulators;

Fig. 3 is a top plan view on a larger scale, showing the details of construction of the strain carrier;

Fig. 4 is a side elevational view taken from the right side of Figure 3;

Fig. 5 is a fragmentary sectional view taken on the plane of the line 5—5 of Figure 3, looking in the direction of the arrows;

Fig. 6 is a fragmentary sectional view taken on the plane of the line 6—6 of Figure 3, looking in the direction of the arrows;

Fig. 7 is a fragmentary sectional view taken on the plane of the line 7—7 of Figure 4, looking in the direction of the arrows;

Fig. 8 is a fragmentary sectional view taken on the plane at right angles to the view of Figure 7;

Fig. 9 is a top plan view of the attachment for engaging a dead end clamp;

Fig. 10 is a sectional view taken on the plane of the line 10—10 of Figure 9; and Fig. 11 is a side elevational view of the attachment of Fig. 9.

Referring to Figures 1 and 2, 10 indicates in its entirety the dead end strain carrier embodying the invention, which includes a pair of insulating wooden poles 11 and 12. The poles 11 and 12 may be made of well seasoned laminated maple or spruce, and are preferably substantially cylindrical in shape and protected by an electrically insulated varnish.

The poles carry a pair of yokes of which 13 is the tower end yoke and 14 the dead end yoke, and the poles are provided with a multiplicity of regularly spaced partially circular peripheral grooves 15, which are provided over the major portion of the length of the two poles.

The grooves are not employed over an ungrooved portion 16 near the tower yokes as the length of this ungrooved portion represents a minimum length beyond which it is not desirable to go in bringing the yokes adjacent each other.

At the left end of the poles, Figure 1, each pole is provided with a cast metal ferrule 17, Figure 4, which comprises a cylindrical metal member having a cylindrical socket 18, of sufficient diameter to receive the end of the pole.

The ferrule 17 has its end wall 19 provided with a through bore 20 for receiving the shank of the take-up screw 21, which screw has a head 22 of sufficient size to be received in the bore 18. Instead of a head the take-up screw 21 may be provided with a nut having a through pin 23, which also passes through the ferrule and secures the take-up screw 21 fixedly to the pole in axial position.

In other embodiments of the invention the ferrule 17 may be cast with a hexagonal socket in its end wall 19 for receiving the head of the take-up screw which may be confined in said socket by engagement with the end of the wooden pole.

The wooden pole is secured in the ferrule 17 by means of the transverse through pins 24, 25, the holes for which are drilled after the parts are assembled so that the pins and pole will be tight in the socket, and the pins are riveted over at each end.

The tower end yoke 13 comprises a cast metal member which is slightly arched so that it has a concavity at 26 on its inside and a hump at 27 on its outside, and the end portions 28 and 29 extend in a direction away from the hump 27.

The yoke 13 may have a central web 30, which is bordered on the outside by laterally projecting ribs 31, and on the inside by laterally projecting ribs 32. The ribs 31 and 32 extend upward and downward with respect to the web 30, giving each edge portion a substantially T-shape.

At its center, inside the hump 27, the yoke 13 is provided with a slightly arcuate elongated through slot 33, which is bordered by the outwardly extending re-enforcing rib 34, on both sides of the yoke, and the rib 34 is connected to the border ribs 31 and 32 by integral formations 35, 36.

The formation 36 has a dead end bore 37, in which a conically pointed steel pin 38 is seated for engagement with a wooden pole. The elongated aperture 33 may be used for receiving a chain 39, Figure 1, which is provided with a hook 40, of the type having its slot just large enough to pass over one of the links of the chain 39. By means of the chain 39, the yoke 13 may be secured to poles, cross arms, towers, etc.

The hump 27 of this yoke is also preferably provided with an integral centrally located lug 41, having a through bore 42, and adapted to serve for attachment of a clevis.

At each of its end portions 28, 29, the yoke 13 is provided with a socket 43, the details of which are shown in Figures 5, 7 and 8. The yoke may be of uniform thickness with respect to its border flanges 31, 32, but it preferably has its web 30 tapered toward both end portions 28, 29, the border flanges approaching each other so that the yoke is of less thickness at its ends.

At each end the yoke has a pair of substantially solid end portions providing sufficient material for the sockets 43. Each socket has a flat bottom 44, Figure 8, the socket being located in the outer side of the yoke, and the socket may have outwardly spreading walls 45 on the sides toward which the take-up screw pivots.

The socket may have a pair of bearings for the trunnions formed at 46 in the two diametrically opposite sides, the axis of these bearings being at right angles to the yoke 13. Below the socket 43, the end portion 29 of the yoke has a parallel sided slot 47, the two flat walls 48 of which are parallel to each other and spaced sufficiently to pass the shank of the take-up screw 21.

The take-up screw 21 is threaded over the major portion of its length so as to permit the take-up of substantially the full length of the screw, the unthreaded portion being only that which remains below the socket 43 when full take-up has been achieved.

The slot 47 preferably has its back wall 49, Figure 8, beveled toward the lower side to provide a maximum room for pivotal movement of the take-up screw 21, with respect to the yoke. The two parallel side walls 48 of the slot 47 are formed on the laterally projecting lugs 50 of the end portion of the yoke, which provides sufficient material for aligned through bores 51, for receiving the threaded eye bolt 52 which is threaded into the bores 51.

By having the eye bolt 52 threaded into both bores, which are tapped simultaneously, the eye bolt 52 may be withdrawn sufficiently to clear the slot 47, while still being held by the threads of the bore in the lug 50, which is nearest to the head of the eye bolt.

By providing the head of the eye bolt in the form of a circular eye 53, this member may be manipulated by means of a clamp stick when it is applied to an energized conductor. The shank of the eye bolt 52 passes across the slot 47, and effectively locks the take-up screw 21, with its shank in the slot 47. This makes the device safe since the take-up screw cannot become detached from the yoke, even though the bearing member of the take-up screw gets out of the socket 43.

The take-up screw 21 in each case is provided with an apertured trunnion member 54, Figure 7, which has the cylindrical trunnions 55 to be received in the bearing portions 46 of the socket 43. Trunnions 55 are carried by a central body portion 56, the bottom of which has a pair of beveled surfaces 57, so that there is a maximum clearance between the bottom of the trunnion member 54 and the walls and bottom of the socket 43. This permits a maximum pivotal movement.

The body 56 is generally cylindrical at its upper part 58, and it has a flat annular thrust surface 59 surrounding a cylindrical core 60. The cylindrical core is of sufficient size to be received inside the cylindrical bore 61 of a ball bearing assembly 62, the lower surface of which rests upon the thrust surface or seat 59.

The ball bearing assembly 62 comprises upper and lower races 63, 64, each of which has an annular race or groove 65 semi-circular in cross section for receiving the balls 66. Any form of suitable ball bearing assembly may be employed.

The ball bearing assembly 62 is preferably of such a type that it is assembled as a unit, with its races secured together about the balls 66 so that the balls cannot drop out. The ball bearing assembly 62 is engaged on the outer surface of its race 63 by the take-up nut 67. This is a special nut having a threaded bore 68 and a relatively long hexagonal outer surface 69 for engagement with a ratchet wrench.

On its outer end the nut has an annular flange 70, which is relieved at 71 about the take-up screw 21, and has an annular thrust surface 72 for engaging the ball bearing assembly 62. When the nut 67 is rotated, by means of a ratchet lever, the upper race 63 rotates with the nut while the lower race 64 remains fixed with the trunnion member 54.

The trunnion member 54 has a through bore 73 of sufficient size to provide a clearance about the threads of the take-up screw 21. The construction of these parts is identical at both ends of the yoke 13, so that the take-up screw is mounted for pivotal movement on the trunnions 55, which have their axes at right angles to the general plane of the yoke 13.

When yoke 13 is combined with the poles 11 and 12, and the other yoke 14, these parts form a parallelogram which has pivots at its four corners so that strain is equally distributed between the two poles 11, 12 by virtue of the pivotal mounting of the yokes at the four corners, even though the nuts 67 are adjusted to unequal positions on the bolts 21.

Referring to Figures 2, 3, 5 and 6, the yoke 14 is the dead end yoke to which the energized conductor is to be attached. The yoke 14 is preferably constructed of two separate halves, the castings for which may be identical, but the halves of this yoke support different fixtures. The two halves are indicated by the numerals 74 and 75.

Each of the halves preferably comprises an elongated cast metal member provided with a substantially straight, central body portion 76, with a pair of offsets 77, 78, adjacent each end, and with an enlargement 79 and 80 at each end that is provided with bearings.

The castings 74, 75 are each preferably formed with a web 81, Figure 3, bordered by the outwardly projecting border flanges 82, 83. The web tapers toward both ends so that the yoke castings are wider toward the center where the maximum strain is expected.

Like the tower end yoke 13, the yoke 14 is outwardly convex at 84, Figure 3, on its outer side and inwardly concave at 85 on its inner side, thereby tending to centralize the pull on a pole or other support.

The re-enforcing border flanges 82, 83 are joined by a central transverse re-enforcing flange 86, and the web may be thickened at four lugs 87, equally spaced from each other on opposite sides of the rib 86 to provide a stronger body at the point for the attachment of bolts.

The two halves may be secured together by means of a pair of screw bolts of the kind indicated at 88, Figure 6, which also support a tubular spacer 89 for holding the halves 74, 75 in spaced relation to each other. Only two bolts 88, with spacers 89, are preferably employed, both located on the same side of the center of the yoke in order to leave the central space 90 between the halves of the yoke open for insertion of the energized conductor 91 from the opposite side, which opposite side is closed by a sliding locking arm pin 92.

The locking arm pin 92 comprises a steel pin, the extreme end of which is frusto-conical at 93, to guide it more readily into the apertures in the two halves. The pin slides into aligned apertures in the lugs 87, on the side opposite to the bolts 88, and is pivotally secured at its upper end to a locking arm 94.

The locking arm 94 comprises a cast metal member which is enlarged to a triangular shape to provide a circular aperture 95, large enough to receive the tool end of a clamp stick. From the aperture 95, the locking arm 94 tapers toward both ends and its free end 96 is curved inwardly toward the locking pin 92, to which it is secured by a rivet. The aperture for this rivet in the arm 94 may be a transverse slot, allowing a slight sliding movement at the pivot of the pin 92, since the pivot moves in a straight line.

At its opposite end, locking arm 94 is pivoted by means of rivet 97 to bearing flanges carried by a bolt 98, which is secured to the yoke half 75 in a special socket provided for the head of the bolt.

The socket which is provided for the head of bolt 98, on yoke half 74, is utilized on yoke half 75 for supporting a pair of eye bolts 99, 100, the enlarged rings of which may serve as cradle hooks for receiving the wooden cradle rods 101, 102, Figure 2. Eye bolts 99, 100, are, therefore, provided with larger eyes than those usually employed for a clamp stick connection, and the eye bolts are secured by nuts above and below the web 81 of the yoke half 75.

The yoke castings 74, 75 are provided with offsets 77, 78, in order to provide parallel enlargements 79 and 80 at each end, which are spaced sufficiently to pass the poles 11 and 12 as well as the pole clamps, by means of which the poles are attached to yoke 14.

The enlargements 79 and 80 of this yoke are also provided with laterally open slots 103, 104, like the slots 47 of Figure 5, to provide partially open bearings for the trunnions 105, 106 on the pole grippers. In this case, however, the slots are not provided with eye bolts 52, as shown in Figure 5, but are more readily detachable because the yoke halves are provided with the U-shaped retaining springs 107 on each of the ends of each yoke, the legs of the spring embracing the trunnions 105, 106.

Springs 107 have a circular end portion which is secured by means of a screw bolt 108 to the yoke half. The two legs of the springs 107 are curved outwardly at 109 to provide a bell mouth into which the trunnions 105, 106 may be forced to be retained behind the curved shoulder 110, on each leg of the spring.

The pole grippers 111 are shown in elevation in Figure 6, and each of these may consist of a metal casting and they are identical in construction. Each pole gripper 111 has a half cylindrical body portion 112, which is integrally joined to a pair of parallel flanges 113.

The flanges 113 support the oppositely extending trunnions 105, 106, which are mounted in the open bearings 103, 104. The length of the cylindrical portion 112 is sufficient to span the space on the poles 11 and 12 between a pair of grooves 15, and the inside of the cylindrical portion 112 is provided with a pair of partially circular locking ribs 114, which are also circular in cross section to fit in a pair of grooves 15 on the poles 11 and 12. Thus the locking ribs 114 prevent the pole grippers from sliding longitudinally on the pole except when the pole is moved away from the cylindrical portion 112 with the ribs 114 out of the grooves 15.

The parallel flanges 113 of the pole grippers 111 are each provided with the inwardly extending flanges 115 joined by an integral yoke 116 that has a threaded bore 117 for the eye bolt 118. Eye bolt 118 ends in a ring 119, large enough to be grasped by means of a clamp stick, and at its opposite end the eye bolt has a reduced cylindrical portion 120, rotatably mounted in a sliding shoe 121.

The sliding shoe 121 comprises a cast metal member of partially cylindrical form and of sufficient width to slide between the flanges 113. Shoe 121 has a central bore 122 for receiving the reduced end 120 of the eye bolt 118, this end being spun outward in a countersunk portion 122, so that the eye bolt is rotatably mounted with respect to the shoe.

The inner cylindrical surface 123 of the shoe again has a pair of locking ribs 124, complementary in shape to the grooves 15 for engaging in the grooves 15 on the side opposite to the ribs 114. Thus the shoe 121 may be advanced or retracted by means of the eye screw 118 to grip or release the poles 11 and 12.

The pole clamp 111 preferably has its body in the shape of relatively thin body flanges re-enforced by a multiplicity of external re-enforcing ribs 125, Figure 3, these ribs appearing about the periphery of the pole clamp at each end and also converging toward the trunnions as seen in Figure 3.

The border flange 83 on the halves of the yoke 14 is of course interrupted at the slots 103, 104 so as to leave this side of the bearing open for entrance of the trunnions 105, 106, which are resiliently gripped by the springs 107.

One pair of trunnions, such as, for example, the trunnions at the right end of yoke 14, in Figure 3, may be provided with an enlarged washer 126, too big to pass the opening between the ends of the border flange 83, at slot 104, and with a through cotter pin 127 in each of the trunnions outside the washer 126. Thus the right end of the yoke 14 is permanently pivoted to the pole clamp and pole 11 at that end, while the left end of yoke 14 is quickly detachable from its pole clamp by springs 107.

The yoke halves 74, 75 are each provided with a central inward bearing flange 128, Figure 3, having aligned apertures 129 serving as bearings for trunnions 130, carried by a dead end conductor engaging fixture 131. The details of construction of this conductor engaging fixture or attachment are shown in Figure 9, which consists of a member which is substantially rectangular in side elevation, as seen in Figure 3, and is provided with the laterally projecting trunnions 130 for engagement in the bearings 129 of the yoke 14.

On its upper surface, in Figure 3, the attachment 131 is formed with a frusto-conical surface 132 surrounding the circular portion 133 of a laterally open slot 134. The round portion 133 of slot 134 is gradually curved on its lower side, as indicated by the dotted line 135, so that there are no sharp corners engaging the conductor. Lugs 148 urge clamp 147 into socket 132.

The attachment 131 is placed in its bearings with the slot 134 opening toward the pole 12, since this is the pole that is removed in applying the carrier to an energized line.

Referring to Figure 2, this shows one type of cradle that may be employed when a string of insulators is to be removed. This cradle has a pair of wooden rods 101, 102 which are held in spaced relation by curved, transverse frame members 136 that have clamping rings 137 provided with screw bolts 138 at each end. A third transverse frame member 139 has tubular extensions 140 on its clamping rings, and the tubular extensions have transverse apertures mounting the metal rods 141 and 142 which diverge to engage hooks 143 on each of the poles.

The hooks 143 are partially circular and complementary to the outside of poles 11 and 12, and have enlargements 144, with through bores for the rods 141, 142. Set screws 145 extend into threaded bores in the enlargements 144 and clamp the rods 141 and 142.

At the yoke 14 the cradle is supported by means of the enlarged eyes 99, 100. At the opposite end the cradle is supported by means of the hooks 143 on the poles 11 and 12.

Referring to Figure 2, this figure shows the strain carrier in position to take the strain which is present in the conductor 91 by reacting against the line pole 146. The conductor 91 is held by means of the dead end clamp 147, which has been detached from its anchorage on the pole or cross arm, and the left end of the clamp 147 is seated in the tapered concavity of the attachment 131, carried by the inner side of the yoke 14.

The method of manipulation and the mode of operation of the strain carrier is as follows:

The pole clamps 111 are first set to engage the selected grooves 15 on the poles so that the assembly will be of the proper length to permit a take-up of the tension by means of the take-up screws 21 and nuts 67, when the other yoke 13 has been engaged with the pole, cross arm or the like.

The pole 12 is disengaged from the yoke 13 at its upper end, Figure 3, by unscrewing the eye screw 52 to such a point that it is held only by the left hand flange 50, clearing the slot so that the take-up screw 21 may move out of the slot of the yoke 13. The take-up nut 67 on each of the poles 11 and 12 is backed off to allow the trunnions 55 to clear their recesses, and also to permit a maximum amount of threaded adjustment of the nut when the take-up is to be later accomplished.

The pole 11 is also removed from the yoke 13 in the same way, and the pole 11 is to be used in manipulating the yoke 14, which is to be engaged with an energized conductor.

The yoke 13 may then be chained behind a line pole, cross arm or tower arm, or it may be chained in position resting atop a cross arm or tower arm, or it may be secured by means of a strain jack or other pulling device attached to the lug 41.

First the pole 12 is also disengaged at its lower end from the yoke 14 by pushing downward in Figure 3 until the trunnions pass out of the springs 107, and out of their bearings while permitting the hump 84 of the yoke 14 to react against some fixed member during this detachment. This opens the left end of the yoke 14 so that the conductor may have access to the space between the yoke halves 74, 75, Figure 6.

A second operator may engage the eye 95 in the lever 94 with a clamp stick and by pivoting the lever 94 clockwise, in Figure 6, the pin 92 is removed from its locking position so that a conductor 91 may move into the central space between the halves 74, 75 of the yoke 14, where it is to be secured.

With the yoke 14 in this open condition, still secured to the pole 11, the operator may grasp the free end, that is, the upper end, in Figure 3, of pole 11, and he may extend the yoke beyond the insulators and beyond the dead end clamp to move the two halves 74, 75 of the yoke 14 over the conductor into the space shown for the conductor 91 in Figure 6.

As soon as this has been accomplished the operator who has hold of the lever 94, by means of a clamp stick in the hole 95, should pivot the lever 94 counterclockwise to drive the pin 92 into the locking position shown in Figure 6.

The yoke 14 is now locked upon the conductor at a point beyond the dead end clamp, and is held by the operator by means of pole 11. The clamp stick should then be removed from the lever 94. At this time the conductor 91 is also located in the slot 134 of the attachment 131, Figure 3, Figure 9.

The operator may then move the yoke 14 backward against the dead end clamp, seating the dead end clamp in the tapered recess 132 of the attachment 131. The frusto-conical nature of the recess 132 tends to center the end of the dead end clamp in this socket, also centering the conductor in the rounded portion 133 of slot 134.

The dead end clamp is seated in socket 132 behind the trunnions 130, that is, to the left in Figure 9, and this tends to keep the attachment 131 in proper alignment with the line of pull. In other words, the socket 132 is deeper than the axial line through the trunnions 130 so that a stable condition exists in the engagement of the dead end clamp with the pivoted attachment 131.

With the pulling yoke 14 in position the operator then secures the pole 12 to the yoke 14 by grasping the take-up screw end of the pole 12, and moving the pole clamp 111 between the halves 74, 75 of yoke 14 until the trunnions 105 can be moved into the slot 103 and into the space between the springs 107 where the trunnions are grasped by the springs.

The two operators who are holding the device by means of its insulated poles 11 and 12, may then reattach the take-up screw ends of the poles 11 and 12 to the yoke 13, which has been previously secured to some fixed abutment, such as a line pole. This is done by passing the take-up screws into the slots 47 and arranging the trunnions 55 so that they rest in their bearings 46 in the yoke 13.

The take-up screws 21 are locked in the slots 47 by means of the eye screws 52, which are screwed in until they engage and pass through the opposite flange 50 and are preferably driven home until the flange below the eye is against the adjacent flange 50.

The take-up nuts 67 may then be turned by hand on the take-up screws 21, until all the slack is taken up in the tool setup. Thereafter a wrench is applied to the nuts 67, such as a ratchet socket wrench, and the nuts 67 are driven downward on the take-up screws 21, Figure 3, until all of the strain is taken off the dead end insulators and the tension of the line conductor is borne by means of the dead end clamp, engaging the yoke 14, which in turn is supported by the poles 11 and 12 and yoke 13.

As to the operation of the tool, either nut may be tightened on either pole 11 or 12 as much as desired, as it is not necessary to take up both poles equally since the poles have pivotal engagement at each of the four corners of the strain carrier frame, that is, at the end of each yoke.

If the insulator in question is a string insulator the cradle may be attached to the present tool, as shown in Figure 2, to provide support for the insulator while it is being removed. When the conductor is again to be attached to the insulator attachment is made from the insulator to the dead end lamp and then the nuts 67 are backed off by means of a wrench until the strain is taken by means of the dead end clamp and insulator. Then the nuts 67 may be backed off by hand until the trunnions 55 can be moved out of their bearings in the yoke 13, the eye screws 52 are backed off to open the slot 47 and the poles are detached from the yoke 13, which is then removed from the support to which it was chained.

The pole 12 is then removed from the yoke 14 by pushing on the pole 12 while holding the yoke 14 by means of a clamp stick, the springs 107 releasing the trunnions 105, the removal of the pole 12 opens the space between the halves 74, 75 at one end.

The locking pin 92, Figure 6, may be pulled out by using a clamp stick attached at the hole 95 to lever 94, thereby unlocking the yoke 14 with respect to the conductor 91. Using the pole 11 as a handle the yoke 14 may then be moved off the conductor, being first backed away so that the dead end clamp 147 is disengaged from the socket in the attachment 131.

It will thus be observed that I have invented an improved dead end strain carrier having the following advantages:

(1) The poles are pivoted at the four points of their engagement with the yokes so that no bending strains are placed on the poles.

(2) No bending strains are placed upon the poles by their use in installations where there are deep sagging angles or on ridge top locations.

(3) Either screw may be entirely taken up without manipulating the other take-up screw nut, and the tool cannot be overstressed by improper take-up procedure.

(4) The amount of weight handled by an operator is greatly reduced and the strain carrier may be installed on insulator strings without removing arcing horns or gradient rings.

(5) The tool may be used with or without separate take-up jacks and when the latter is used the travel can be increased sufficiently to add insulators or remove them from the string where the transmission voltage is increased or decreased.

(6) The torsional strain on the take-up screws and the effort required are reduced by the use of ball bearings.

(7) The tool is locked on the conductor and the latch is automatically released when the lift eye is used to remove the yoke from the line conductor.

(8) The present tool may be taken apart so that it can be stored in a minimum space, and it may be provided with interchangeable clamp sockets so that its range of use may be greatly extended over the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a dead end strain carrier, the combination of a pair of elongated cylindrical wooden insulating poles, said poles each having a tubular fixture carried by one end, and provided with an axial threaded bolt, a metal yoke provided at each of its ends with an upwardly open slot for receiving said bolts between a pair of legs, a threaded pin located in aligned apertures in said legs to hold the bolts in said slots, a trunnion member reacting against a nut on each bolt and having a bore surrounding each bolt, and having a pair of trunnions receivable in a pair of half bearings formed in said yoke adjacent each of said slots, said trunnions and half bearings having their axes at substantially right angles to the plane of said poles, means for pivotally securing said yoke to a line pole midway between the ends of the yoke, and means carried by said insulating poles for securement to a line conductor.

2. In a dead end strain carrier, the combination of a pair of elongated cylindrical wooden insulating poles, said poles each having a tubular fixture carried by one end, and provided with an axial threaded bolt, a metal yoke provided at each of its ends with an upwardly open slot for receiving said bolts between a pair of legs, a threaded pin located in aligned apertures in said legs to hold the bolts in said slots, a trunnion member reacting against a nut on each bolt and having a bore surrounding each bolt, and having a pair of trunnions receivable in a pair of half bearings formed in said yoke adjacent each of said slots, said trunnions and half bearings having their axes at substantially right angles to the plane of said poles, means for pivotally securing said yoke to a line pole midway between the ends of the yoke, and means carried by said insulating poles for securement to a line conductor, a cradle for an insulator, comprising a pair of insulating wooden poles, transverse frame members securing the latter poles in parallel position, and means for hanging said parallel poles below and between the first-mentioned poles.

3. In a dead end strain carrier, the combination of a pair of elongated cylindrical wooden insulating poles, said poles each having a tubular fixture carried by one end, and provided with an axial threaded bolt, a metal yoke provided at each of its ends with an upwardly open slot for receiving said bolts between a pair of legs, a threaded pin located in aligned apertures in said legs to hold the bolts in said slots, a trunnion member reacting against a nut on each bolt and having a bore surrounding each bolt, and having a pair of trunnions receivable in a pair of half bearings formed in said yoke adjacent each of said slots, said trunnions and half bearings having their axes at substantially right angles to the plane of said poles, means for pivotally securing said yoke to a line pole midway between the ends of the yoke, means carried by said insulating poles for securement to a line conductor, a cradle for an insulator, comprising a pair of insulating wooden poles, transverse frame members securing the latter poles in parallel position, and means for hanging said parallel poles below and between the first-mentioned poles, comprising a pair of diagonally extending rods carried by collars on said first-mentioned wooden poles.

4. In a dead end strain carrier, the combination of a pair of elongated cylindrical wooden insulating poles, said poles each having a tubular fixture carried by one end, and provided with an axial threaded bolt, a metal yoke provided at each of its ends with an upwardly open slot for receiving said bolts between a pair of legs, a threaded pin located in aligned apertures in said legs to hold the bolts in said slots, a trunnion member reacting against a nut on each bolt and having a bore surrounding each bolt, and having a pair of trunnions receivable in a pair of half bearings formed in said yoke adjacent each of said slots, said trunnions and half bearings having their axes at substantially right angles to the plane of said poles, means for pivotally securing said yoke to a line pole midway between the ends of the yoke, means carried by said insulating poles for securement to a line conductor, a cradle for an insulator, comprising a pair of insulating wooden poles, transverse frame members securing the latter poles in parallel position, means for hanging said parallel poles below and between the first-mentioned poles, comprising a pair of diagonally extending rods carried by collars on said first-mentioned wooden poles, said yoke having an enlarged socket at each end surrounding the closed end of each of said slots for receiving said trunnion member and permitting maximum pivotal movement.

5. In a dead end strain carrier, the combination of a pair of elongated cylindrical wooden insulating poles, said poles each having a tubular fixture carried by one end, and provided with an axial threaded bolt, a metal yoke provided at each of its ends with an upwardly open slot for receiving said bolts between a pair of legs, a threaded pin located in aligned apertures in said legs to hold the bolts in said slots, a trunnion member reacting against a nut on each bolt and having a bore surrounding each bolt, and having a pair of trunnions receivable in a pair of half bearings formed in said yoke adjacent each of said slots, said trunnions and half bearings having their axes at substantially right angles to the plane of said poles, means for pivotally securing said yoke to a line pole midway between the ends of the yoke, means carried by said insulating poles for securement to a line conductor, and said latter means comprising a line conductor clamp carried by a second yoke adjustably secured to said first-mentioned wooden poles.

6. In a dead end strain carrier, the combination of a pair of elongated cylindrical wooden insulating poles, said poles each having a tubular fixture carried by one end, and provided with an axial threaded bolt, a metal yoke provided at each of its ends with an upwardly open slot for receiving said bolts between a pair of legs, a threaded pin located in aligned apertures in said legs to hold the bolts in said slots, a trunnion member reacting against a nut on each bolt and having a bore surrounding each bolt, and having a pair of trunnions receivable in a pair of half bearings formed in said yoke adjacent each of said slots, said trunnions and half bearings having their axes at substantially right angles to the plane of said poles, means for pivotally securing said yoke to a line pole midway between the ends of the yoke, means carried by said insulating poles for securement to a line conductor, comprising a second yoke having a pair of substantially parallel frame members secured together in spaced relation to each other to receive the line conductor between them, half bearing slots formed in each of said parallel members at each of their ends, and a cylindrical clamping member having a pair of trunnions to be received in said bearing slots, said clamping members having a fixed cylindrical clamping surface, and a movable part cylindrical clamping member actuated by an eye screw.

7. A yoke for a dead end strain carrier, comprising a pair of metal members, each having two angular portions joined at an obtuse apex, said metal members being secured together by spacers and through securing members adjacent said apex in substantially parallel position, for receiving a line conductor between them, a lever pivotally mounted on one of said members on the outer side thereof, and having a pointed plunger pivotally mounted on the end of the lever to slide into apertures in said members on the other side of the apex, for confining the line conductor by means of said plunger, said lever having an eye opening between its ends so that, when the yoke is lifted by means of a clamp stick applied to said eye opening, the plunger is withdrawn to receive said line conductor, and when the clamp stick is removed, the plunger drops by gravity into said apertures, confining the line conductor between said members.

8. A yoke for a dead end strain carrier, comprising a pair of metal members, each having two angular portions joined at an obtuse apex, said metal members being secured together by spacers and through securing members adjacent said apex in substantially parallel position, for receiving a line conductor between them, a lever pivotally mounted on one of said members on the outer side thereof, and having a pointed plunger pivotally mounted on the end of the lever to slide into apertures in said members on the other side of the apex, for confining the line conductor by means of said plunger, said lever having an eye opening between its ends so that, when the yoke is lifted by means of a clamp stick applied to said eye opening, the plunger is withdrawn to receive said line conductor, and when the clamp stick is removed, the plunger drops by gravity into said apertures, confining the line conductor between said members, said yoke members each being formed with laterally open bearing slots at their ends, and a clamping member having trunnions mounted in said bearing slots, said clamping member comprising two partially cylindrical jaws with an eye screw to control their relative movement so that cylindrical wooden poles can be placed in said clamping members and clamped by actuating said eye screw with a clamp stick.

9. A yoke for a dead end strain carrier, comprising a pair of metal members, each having two angular portions joined at an obtuse apex, said metal members being secured together by spacers and through securing members adjacent said apex in substantially parallel position, for receiving a line conductor between them, a lever pivotally mounted on one of said members on the outer side thereof, and having a pointed plunger pivotally mounted on the end of the lever to slide into apertures in said members on the other side of the apex, for confining the line conductor by means of said plunger, said lever having an eye opening between its ends so that, when the yoke is lifted by means of a clamp stick applied to said eye opening, the plunger is withdrawn to receive said line conductor, and when the clamp stick is removed, the plunger drops by gravity into said apertures, confining the line conductor between said members, said yoke members each being formed with laterally open bearing slots at their ends, and a clamping member having trunnions mounted in said bearing slots, said clamping member comprising two partially cylindrical jaws with an eye screw to control their relative movement so that cylindrical wooden poles can be placed in said clamping members and clamped by actuating said eye screw with a clamp stick.

10. A dead end strain carrier adapted to be manipulated by means of a clampstick or other insulating pole, comprising a pair of cylindrical insulating poles, each of said poles being provided with one of its end portions formed with a plurality of spaced peripheral grooves, and the other of its end portions provided with a longitudinally extending threaded bolt, a transverse yoke member for the bolt end of said poles, said yoke member being provided at each end with a lateral open socket for receiving said bolt, and the lateral opening of each socket terminating in a pair of parallel flanges, one of which is threaded, and the other of which is apertured, for receiving a threaded eye bolt for confining the pole bolts in said sockets, each of said pole bolts being provided with a nut and with a trunnion member having a pair of oppositely located trunnions mounted in partially cylindrical bearings formed in the outer sides of said sockets, the said nuts being adjustable on said pole bolts for adjusting the length of the strain carrier in smaller increments than the spacing between said grooves, a second yoke comprising a pair of parallel members secured in parallel relation to each other, and each being provided at each of its ends with partial bearings facing outwardly for receiving trunnions, the said trunnions being carried by a trunnion member extending about said poles, and each of said latter trunnion members being provided with a clamping member actuated by an eye bolt, said clamping member being provided with ribs receivable in said grooves, and all of said trunnions extending in a direction at substantially right angles to said poles and yokes, thereby providing a four sided frame, the sides being pivoted together at each corner for equalizing the strain on both poles and substantially eliminating any bending strain on the poles.

DAVID C. HUBBARD.

References Cited in the file of this patent

UNITED STATES PATENTS

| Number | Name | Date |
|---|---|---|
| 1,940,162 | Bodendieck | Dec. 19, 1933 |
| 2,162,070 | Dunaway et al. | June 13, 1939 |

FOREIGN PATENTS

| Number | Country | Date |
|---|---|---|
| 363,952 | England | Dec. 31, 1931 |
| 551,379 | Germany | June 7, 1931 |